UNITED STATES PATENT OFFICE.

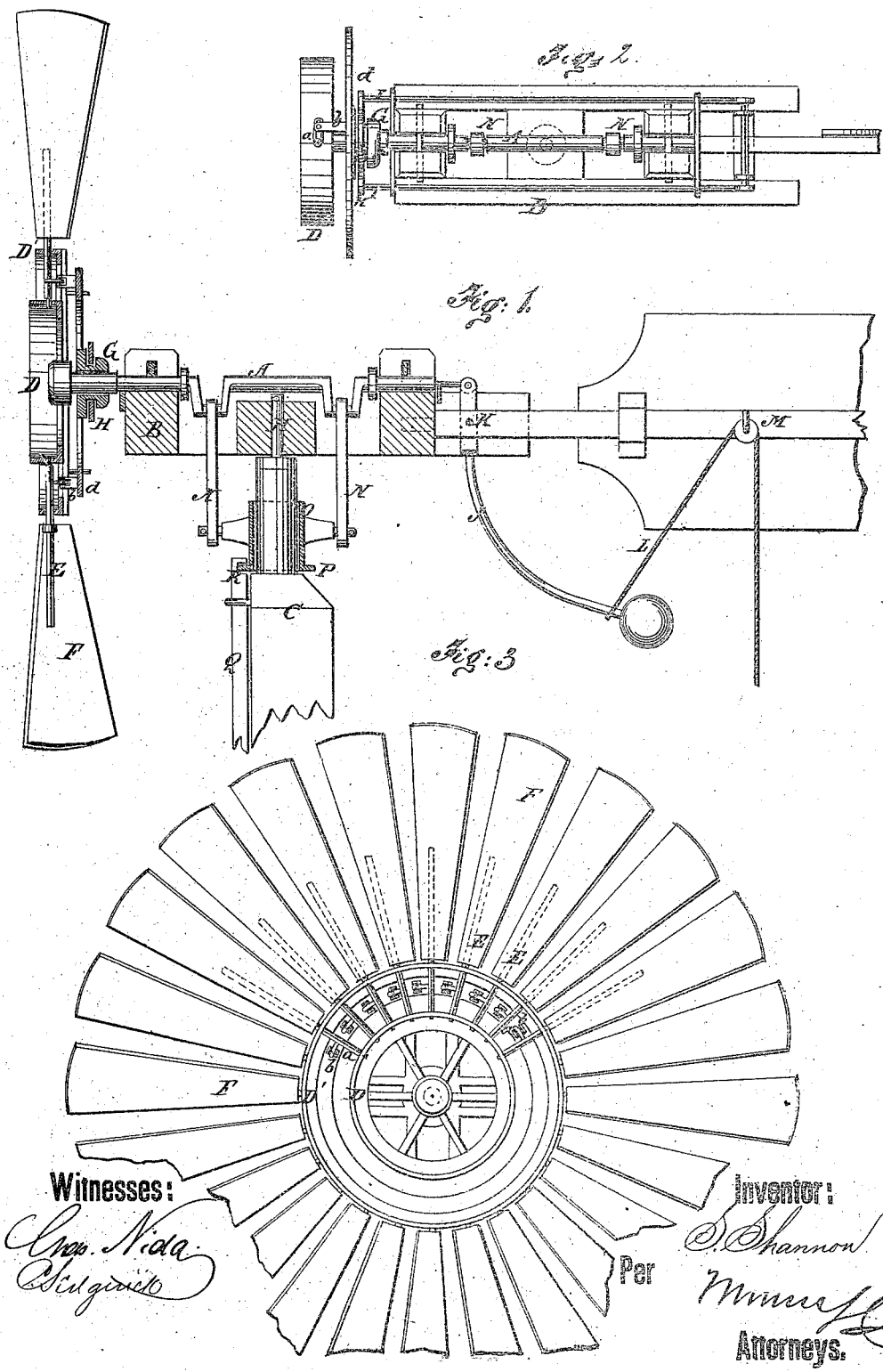

SAMUEL SHANNON, OF SHELLSBURG, IOWA.

IMPROVEMENT IN WINDMILLS.

Specification forming part of Letters Patent No. 140,222, dated June 24, 1873; application filed May 5, 1873.

*To all whom it may concern:*

Be it known that I, SAMUEL SHANNON, of Shellsburg, in the county of Benton and State of Iowa, have invented a new and Improved Windmill, of which the following is a specification:

My invention relates to improvement in the class of windmills having vanes so pivoted that the force of the wind tends to turn them around it; and the invention consists of a double crank-shaft and a reciprocating sleeve on the post, on which the wheel-frame is pivoted, and around which it swings, so contrived that a connection is made with a pump-rod, or two or more, if desired, on the side of the post, and the rod or rods worked thereby without hindrance to the turning of the wheel-frame, and without any cramping or side-draft.

Figure 1 is a longitudinal sectional elevation of my improved windmill. Fig. 2 is a plan view, except the vanes; and Fig. 3 is a front elevation of the wheel.

Similar letters of reference indicate corresponding parts.

A is the crank-shaft; B, the frame, on which it is mounted; C, the post, on which the frame is pivoted; D D', the hub of the wheel; E, the radial arms for supporting the vanes; and F, the vanes. These vanes are pivoted at about one-third of their breadth from the windward side on the arms, so that the wind tends to keep them turned edgewise to it. Each vane-arm is connected by arms $a\ b$ with a disk, D, which slides forward and back on the shaft A, and is connected by the grooved hub G and bar H with the sliding rods I extending to the opposite side of the pivot H', and connecting with the short arm of the weighted lever J, pivoted to the frame at K, and hanging from its pivot in such manner as to tend to turn the vanes to the wind in opposition to the action of the wind itself, so that the extent to which the vanes are subject to the wind depends on the power of the weight, and whenever the wind is strong enough to entirely overcome the weight, as in a gust or tempest, it will turn the vanes entirely out, so that the wheel will stop, and thus the machinery connected with it and the wheel itself will escape any undue strain they might otherwise be subject to. L is a cord, attached to the weighted lever and arranged over a guide-roller, M, so that the vanes can be turned so as not to take the wind by lifting the weighted lever whenever it is desired to stop the wheel; and if only a portion of the power is required, the weight can be lifted partly by the rope and supported by it, the rope being fastened below. The lever and the pulley M for the rope are both arranged on the frame B, so as to turn with the wheel. For transmitting the motion I have a double-crank shaft with two connecting rods, N, and a reciprocating sleeve, O, on the post, with a flange, P, which connects with the pump-rod Q by the notch R, by which the connection is made, so that no obstruction is afforded to the rotation of the wheel-frame, and the power is transmitted without cramping by side draft, which would occur with only one crank and connecting-rod, unless the connection was arranged in the axis of the standard P. The sleeve O and flange P allow of connecting two or more pump-rods, if desired.

Having thus described my invention, I claim as new and desire to secure by Letters Patent—

The double crank-shaft A, two connecting-rods, N, reciprocating flanged sleeve O, and one or more pump-rods Q, combined with the revolving frame B and standard C, substantially in the manner described.

SAMUEL SHANNON.

Witnesses:
J. E. ELSON,
ED. LANGLEY.